United States Patent [19]

Kosson

[11] 4,252,185
[45] Feb. 24, 1981

[54] DOWN PUMPING HEAT TRANSFER DEVICE

[75] Inventor: Robert Kosson, Massapequa, N.Y.

[73] Assignee: Grumman Aerospace Corporation, Bethpage, N.Y.

[21] Appl. No.: 70,262

[22] Filed: Aug. 27, 1979

Related U.S. Application Data

[62] Division of Ser. No. 898,411, Apr. 20, 1978, abandoned.

[51] Int. Cl.³ .............................................. F28D 15/00
[52] U.S. Cl. ...................................... 165/105; 60/531; 122/33; 122/DIG. 2; 126/433; 432/179
[58] Field of Search .......................... 165/105; 60/531; 126/433; 122/33, DIG. 2; 432/179

[56] References Cited

U.S. PATENT DOCUMENTS

| 4,057,963 | 11/1977 | Basiulis | 126/433 X |
| 4,186,559 | 2/1980 | Decker | 60/531 |

OTHER PUBLICATIONS

Basiulis, A. (*VBP Heat Pipes for Energy Storage*) 11th Intersociety Energy Conversion Eng. Conf., American Institute of Chem. Engs., New York, NY, 9/12-17/76.

*Primary Examiner*—Albert W. Davis
*Attorney, Agent, or Firm*—Richard G. Geib; Bruce B. Brunda

[57] ABSTRACT

A heat transferring device for transferring heat from an upper to a lower location utilizing a mechanical pump and motor to provide fluid transport. The device is entirely encased within a single vertically disposed member requiring no external plumbing and a minimum of fabrication. The resulting device is both compact and cost effective.

8 Claims, 10 Drawing Figures

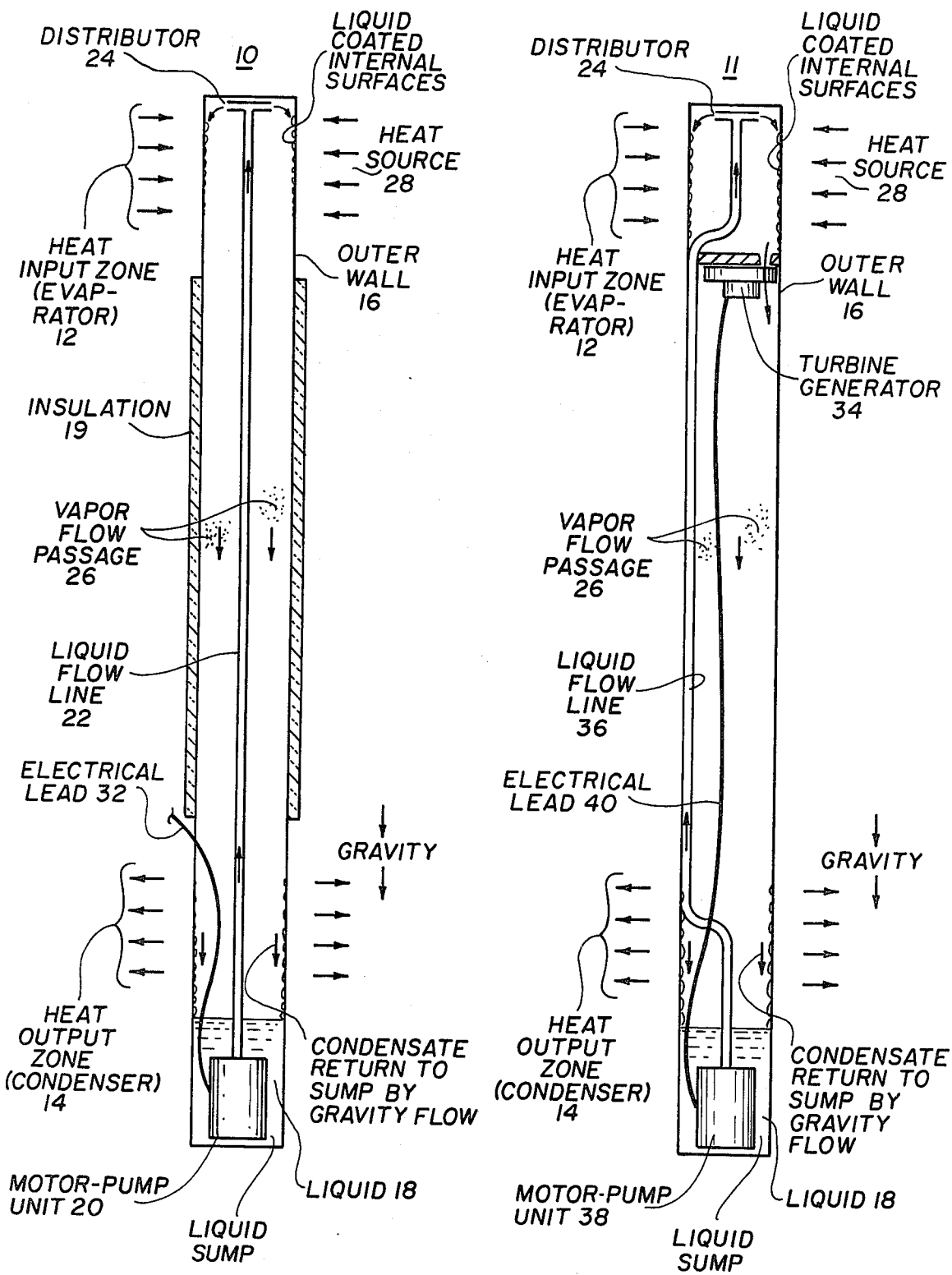

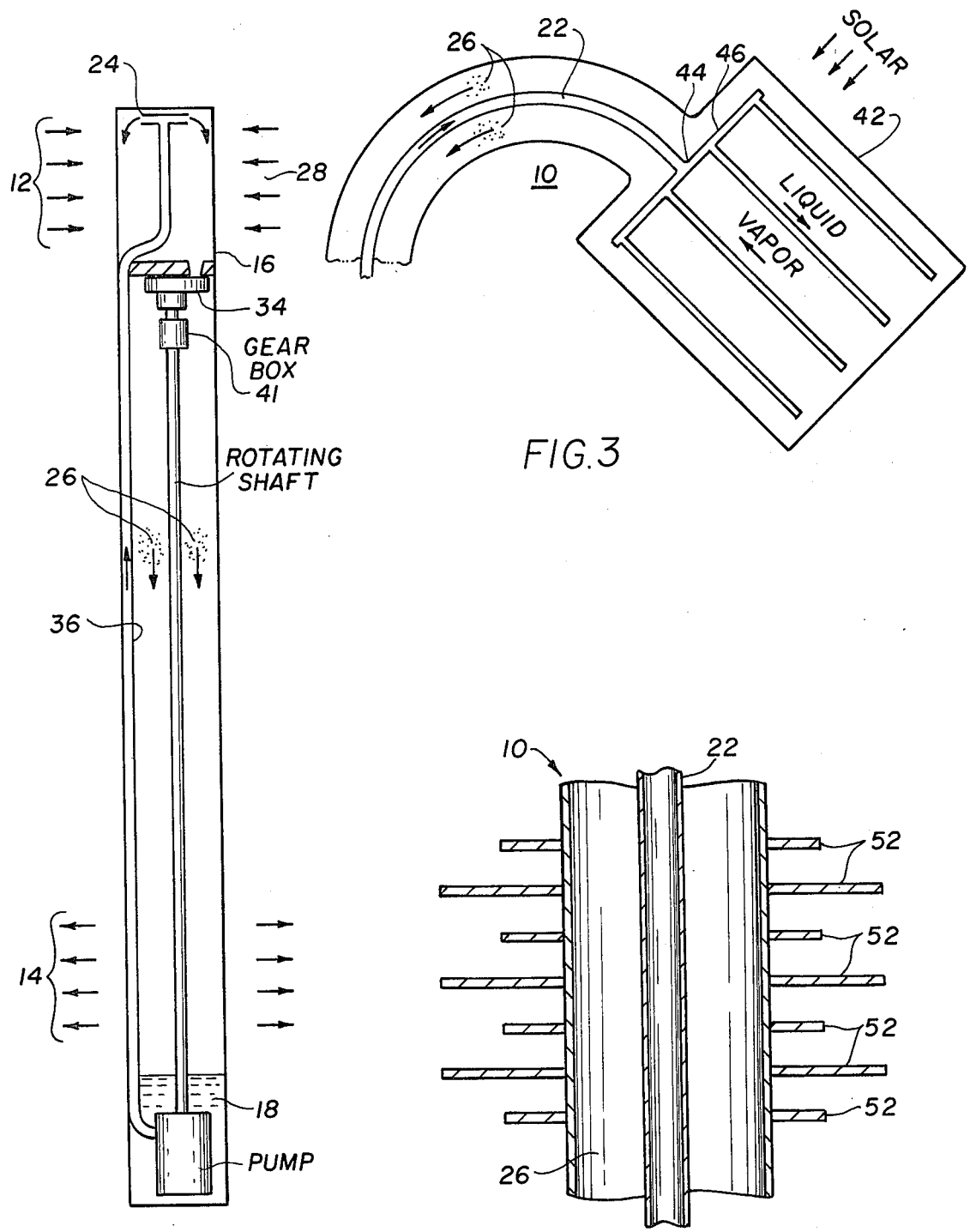

DOWN PUMPING HEAT TRANSFER DEVICE

This is a division of application Ser. No. 898,411 filed Apr. 20, 1978 now abandoned.

BACKGROUND OF THE INVENTION

This invention relates to a heat transferring device and more particularly to a novel heat pipe construction adapted to transport heat in a vertically downward direction from a heat source to a relatively lower heat sink.

In the prior art, various techniques have been proposed in order to transfer heat to a relatively lower location. These techniques utilize principles of evaporation and condensation, thermal convection displacement, forced convection, bubble transport and osmosis. While many of these systems are adequate for certain purposes, they fail to provide a powerful, self-contained heat exchanger unit which utilizes internal mechanical pumping means. The device disclosed herein requires a minimum of fabrication while providing a high capacity unit which is extremely cost effective.

BRIEF SUMMARY OF THE INVENTION

Accordingly, it is a major object of this invention to provide an improved heat transfer unit for transporting heat in a vertically downward direction.

More particularly, it is an object of this invention to provide a novel heat exchanger construction in which fluid elevation is accomplished by means of motor and pump mechanisms disposed within the interior of the heat exchanger unit.

It is a further object of the present invention to provide a pump operated heat transfer unit in which the pump may be driven by an external electrical source or by means of an interiorly disposed vapor actuated motor means.

It is also an object of this invention to provide a novel heat transfer unit in which the heat exchanging fluid may be dispensed at the heat input zone by means of capillary and gravitational action.

It is still another object of this invention to provide a heat transferring device which may be adapted for use to transport heat from a solar collector system to a heat sink such as a hot water storage tank.

It is yet another object of this invention to provide a heat transferring device which may be used with a circulating fluid heat source.

It is a further object of this invention to provide a heat transferring device which may be adapted to transport heat from a boiler discharge system to preheat fuel or air entering into the boiler.

These and other objects and advantages of the present invention will become apparent upon reading the following description and claims with particular reference to the specific embodiments described below.

BRIEF DESCRIPTION OF THE DRAWINGS

An understanding of the features and operation of the present invention can be obtained from a reading of the following description and with reference to the following drawings in which:

FIG. 1 is a schematic diagram of one embodiment of the present invention utilizing an external electrical power source.

FIGS. 2(a) and (b) are schematic diagrams of embodiments of the present invention in which pump power is provided by means of an interiorly disposed vapor actuated turbogenerator and turbo-pump respectively.

FIG. 3 is a plane view of one embodiment of the present invention shown in conjunction with a solar collector unit.

FIG. 4 is a sectional plane view of the invention illustrating the use of an extended heat transfer surface to facilitate heat transport.

DETAILED DESCRIPTION OF THE PREFERRED EMBODIMENT

Figure 6:
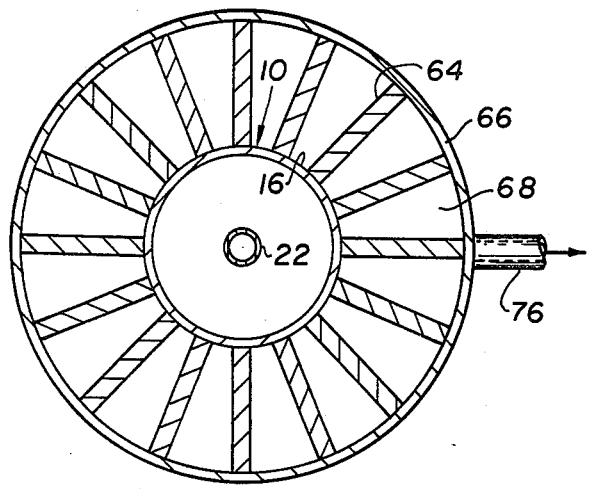
FIG. 6 is a cross sectional view of another embodiment of the invention.

Turning now to the drawings, wherein like components are designated by like reference numerals in both figures, FIG. 1 illustrates a device for downwardly transferring heat, being generally designated 10. Device 10 is shown positioned is such a manner as to have an upper portion disposed within heat input zone 12 and a lower portion within heat output zone 14.

Combination motor and pump unit 20 is positioned within the lower portion of device 10 and adapted to receive heat transferring fluid 18 in a liquid phase and to convey the fluid through conduit 22. Power is supplied to the motor pump unit by means of supply cord 32 which is connectable to an external source of electrical energy.

The invention allows for the use of combination motor-pump devices, as illustrated in FIG. 1, or separate and compatible motor and pump units as may be required.

Fluid distribution means 24 is shown attached to the upper end of conduit 22 and is adapted to disperse the heat transferring fluid over the interior surfaces of outer wall 16 by a combination of capillary and gravitational action. Passageway 26 is provided to accommodate the downward fluid flow in a vapor phase from heat input zone 12. Upper heat source 28 is connected to outer wall 16 as to place the interior of the device 10 in thermal transfer relation with heat input zone 12.

As fluid 18 is dispensed from conduit 22, the heat received by the liquid in heat input zone 12 effects vaporization of the fluid. The continual operation of motor-pump unit 20 results in continual replenishment of liquid lost to evaporation. The vapor formed has sufficient vapor pressure within the upper portions of passageway 26 to cause the vaporized fluid to flow in a downward direction toward heat output zone 14. The lower temperature in zone 14 induces condensation of the fluid, thereby effecting a release of thermal energy which is communicated to output zone 14. Heat transfer through the device may be directed by means such as insulation 19 thereby restricting heat transfer to the heat input and heat output zones.

As compared with alternative concepts such as osmotic and bubble pump techniques, the present invention utilizes a combination of proven mechanical elements such as motor pump unit 20. Locating the pump internally also serves to eliminate the need for seals with their attendant leakage problems and further reduces the amount of fabrication necessary. Reliability should be comparable to sealed refrigeration units. Pump power requirements should be very small compared with the thermal energy transferred (less than 1%). With proper pump selection, the concept is readily adaptable to vertical heights ranging from several feet to several hundred feet.

The requirement for an external electrical power supply can be eliminated by incorporating a vapor driven generator within the heat transfer device as shown in FIG. 2(a). Generator 34 is shown disposed within alternative device 11 just below heat input zone 12. Conduit 36 is adapted to convey heat transferring fluid 18 to the heat input zone while accommodating the operation of the generator. In the embodiment shown, pump 38 is powered by the electrical output from generator 34 as delivered through electrical connector 40.

As with the first embodiment, the amount of electrical power required for pump operation is very small (less than 1% of the energy transported). There would, however, be a small increase in the evaporator to condensator temperature difference, to accommodate the drop in saturation temperature associated with the turbine pressure drop. For example, where the system utilizes ammonia as the heat transporting fluid and is operating at 50° C., approximately 1° C. added temperature drop would be required to pump heat downwards from an elevation of 100 feet.

Where the vertical distance is short (of the order of 10 feet), the generator and connector illustrated in FIG. 2(a) may be replaced by a mechanical drive system 41 connecting the turbine and pump as shown in FIG. 2(b).

One possible application of this invention, as illustrated in FIG. 3, involves roof mounted solar collectors which may be connected to basement or underground thermal storage devices. The use of this invention in conjunction with solar collector units would be an alternative to the circulating liquid loop systems currently being marketed.

In FIG. 3 heat transferring device 10 is shown connected to solar collector apparatus 42. Liquid flow line 22 communicates the heat transfer fluid to collector input conduit 44, which extends to fluid distribution means 46 on the collector surface.

Solar energy heats the collector surface causing the heat transfer fluid to vaporize whereupon it exits collector 42 and enters into passageway 26 of device 10. The remainder of the system operates as previously described in connection with FIGS. 1 and 2. The exterior surface of device 10 is insulated to prevent heat loss to the surrounding area.

FIG. 4 illustrates a further embodiment of the present invention wherein an extended heat transfer surface 52 is secured to the outer surface of heat transfer device 10 in order to facilitate heat transmission between the device and the surrounding environment. This configuration may be used for a variety of applications such as with a circulating fluid heat source or heat sink.

Figure 5:
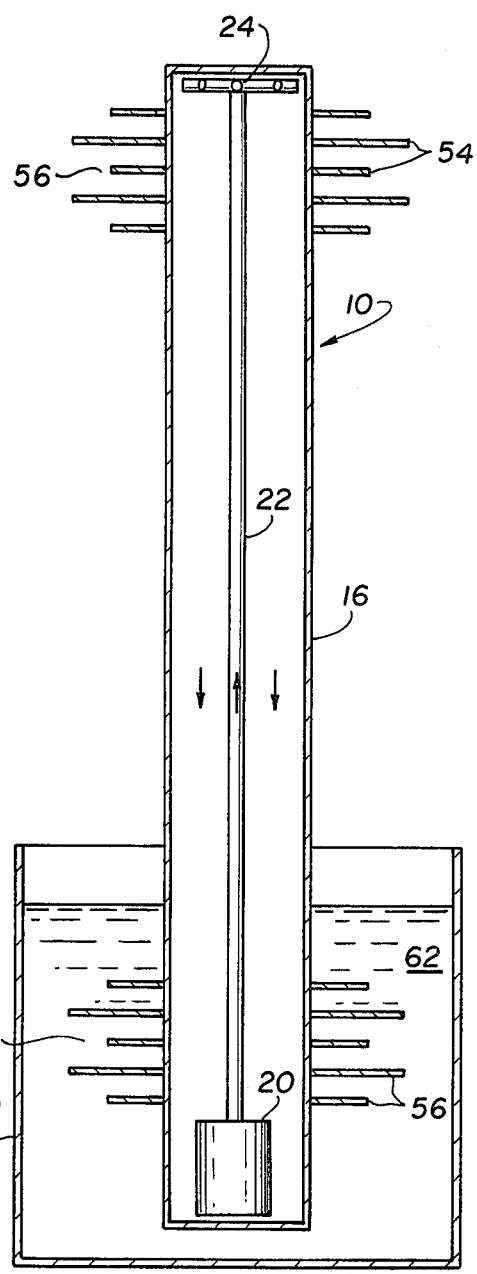
FIG. 5 is a plane view of a further embodiment of the invention including the use of a hot water storage tank as a heat sink.

FIG. 5 illustrates an application of the invention wherein heat transfer device 10 is provided with an extended heat transfer surface in both the heat input and heat output zones. Surface 54 is shown as being disposed within the heat input zone 55 and while surface 56 is disposed within heat output zone 58. The lower portion of the device, including heat output zone 58 is shown interposed within the interior of hot water storage tank 60 so as to be in contact with the water 62 contained therein.

Another embodiment of the invention is depicted in FIG. 6 in which a co-annular configuration is disclosed. Cylindrical sleeving 66 circumscribes a portion of heat transfer device 10 as to form an annular passageway 68 in which a circulating fluid flows. Radial extension 64 communicates heat energy between the interior of heat transferring device 10 and the fluid flowing through passageway 68.

Figure 7:
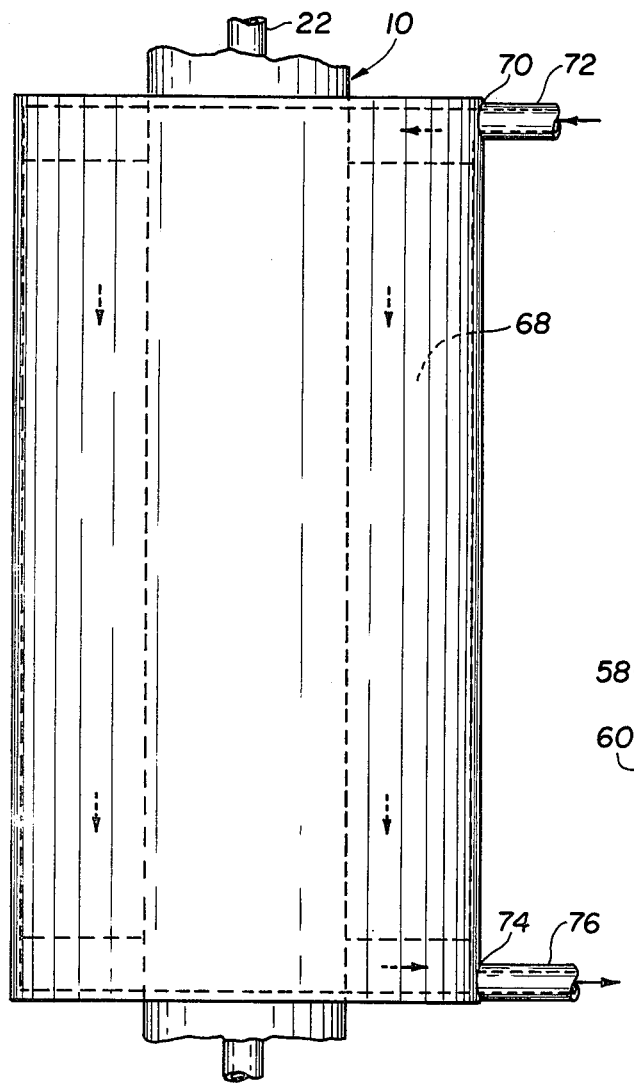
FIG. 7 is a front view of the invention as embodied in FIG. 6.

FIG. 7 is a frontal view of the system of FIG. 6 including a vertical fluid passageway and connecting conduits to and from the system. Input port 70 serves to connect input conduit 72 to passageway 68 through which a circulating fluid flows. Heat transfer between the fluid and radial extensions 64 is accomplished as the fluid traverses the length of passageway 68. Output port 74 allows fluid 18 to leave passageway 68 and enter return conduit 76.

Figure 8:
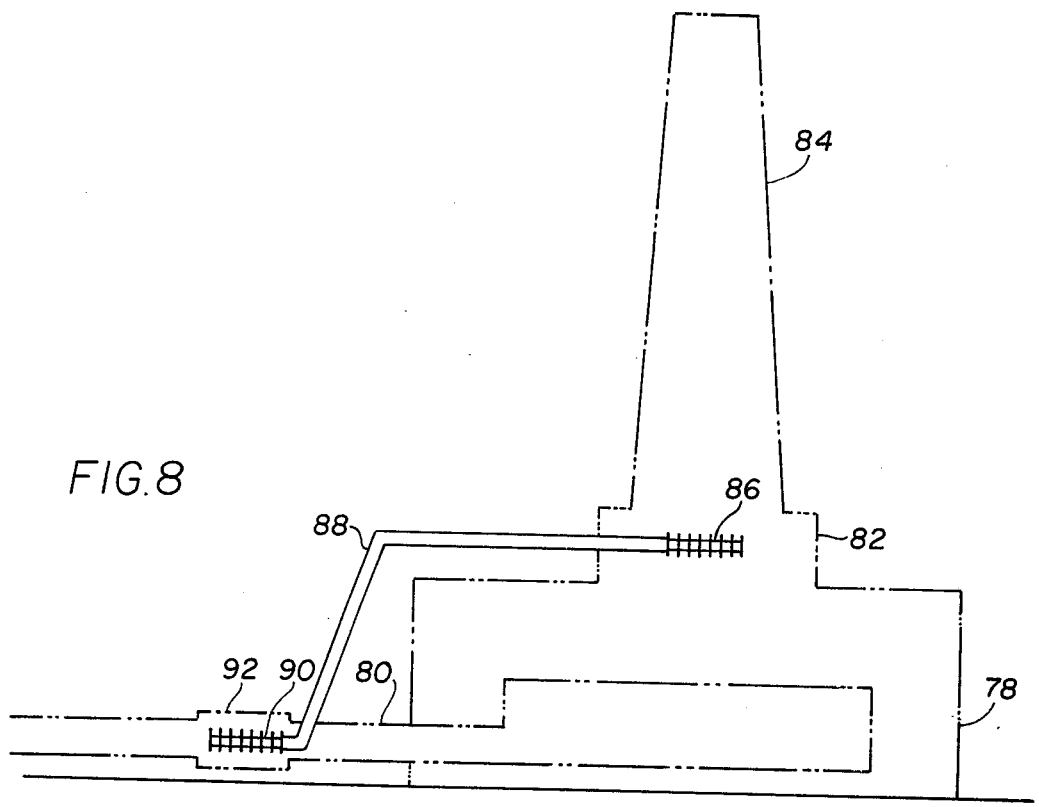
FIG. 8 illustrates a further embodiment of the invention as used in conjunction with a boiler system.
Figure 9:
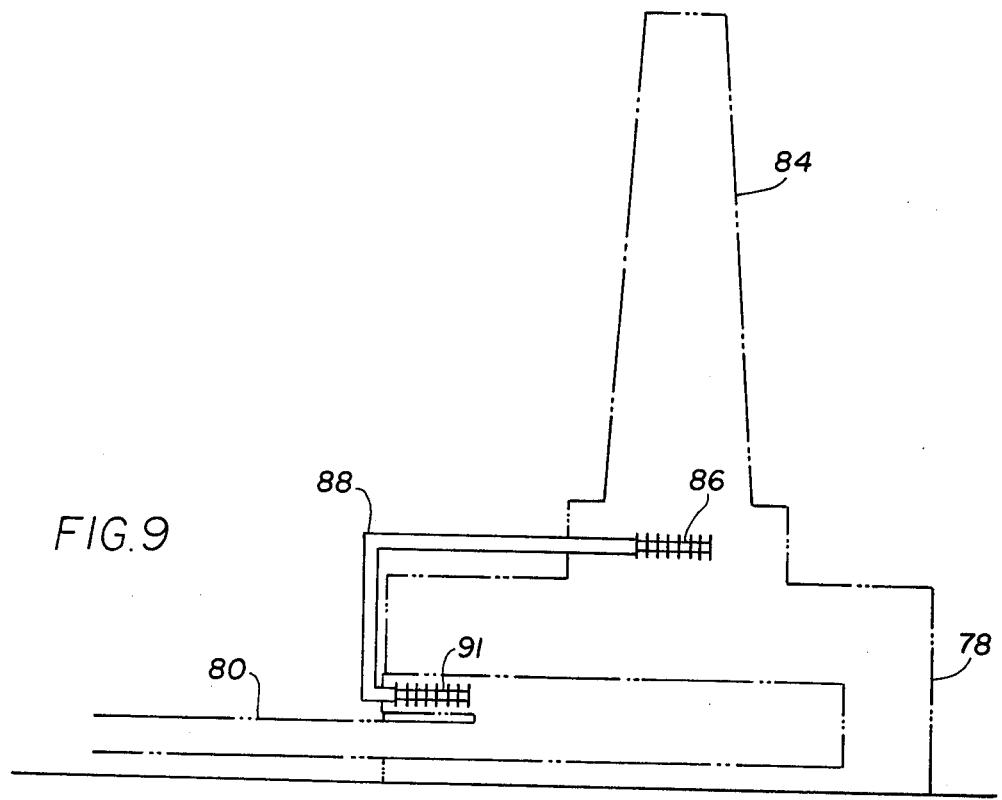
FIG. 9 illustrates an alternative arrangement to FIG. 8 wherein heat dissipation is accomplished by means of a condenser/air heater connected to a boiler.

FIGS. 8 and 9 illustrate the use of the present invention to provide heat recovery from a furnace or boiler system. Fuel enters boiler 78 through fuel input conduit 80. As the fuel is consumed, heat energy is discharged from the system in the form of stack gases. These gases pass through boiler breeching 82 and exit the system through stack 84. Down pumping device 88 is illustrated having a heat input section 86 located within breeching 82. Heat energy which passes through breeching 82 is captured by heat input section 86, whereupon it is communicated by vapor transport through the device 88 to heat output section 90. Fuel heater 92 transmits the heat energy from heat output section 90 to fuel input conduit 80 so as to preheat the fuel entering boiler 78.

If it considered desirable to have an air heater system to preheat the air entering a furnace or boiler, an arrangement such as shown in FIG. 9 may be utilized. In this embodiment of the invention, heat dissipation into boiler 78 is accomplished by means of condenser/air heater unit 91 located near or connected to the boiler. This arrangement eliminates the necessity for large air intake ducts thereby reducing system cost while providing a more versatile heat recovery unit.

While the invention has been disclosed in connection with certain of its physical embodiments, it will be understood that various modifications within the spirit of the invention may occur to those skilled in the art. Therefore, it is intended that no limitations be placed on the invention except as defined by the scope of the appended claims.

What is claimed is:
1. A device for transferring heat comprising:
an outer casing positioned to intersect a heat source region and a heat output zone, said casing defining an internal passageway between the heat source region and the heat output zone, said casing including a liquid sump region,
a fluid transfer conduit positioned within said passage from said liquid sump region and into said heat source region,
condensate pumping means within said liquid sump region and connected to one end of said conduit such that a fluid is pumped from said heat sink region through said conduit to said heat source region,
fluid distribution means connected to another end of said conduit, said distribution means being adapted to disperse said fluid over a first interior surface of said casing to take heat from said heat source region by changing the liquid to a vapor state, heat absorption means located within said heat source region to receive the liquid from said fluid distributor means, said absorption means being in thermal communication with said first interior surface such that heat absorbed by said absorption means causes vaporization of said liquid dispersed over said first surface, a turbine means to provide a source of energy interposed within said passageway between said heat source region and said heat output zone such that the vapor driven by the vapor pressure drives such turbine means to generate energy from flow of said vapor and energy conductive means located within said passageway and connecting said turbine means to said pumping means to connect the energy to said pump means and enable operation of said pumping means whenever said turbine means is being driven by said vapor flowing by reason of vapor pressure therethrough.

2. The device of claim 1 and further characterized in that said turbine means is a turbine generator electrically connected to said pumping means.

3. The device of claim 1 and further characterized in that the turbine means 10 is a mechanical turbo drive means having a rotating shaft connecting with said pumping means.

4. A unit as recited in claim 1 wherein said heat dissipation means are interposed within a fuel input conduit connected to a furnace.

5. A unit as recited in claim 1 wherein said heat dissipation means comprises an air heater connected to a furnace and in heat transfer relationship with said fluid such that heat energy contained in said fluid is transferred to a column of air which in turn is communicated to a furnace.

6. A unit as recited in claim 1 wherein said heat absorption means comprises an extended heat transfer surface secured to said casing within said heat source region, an outer cylindrical sleeving circumscribing said casing and said extended surface as to form a fluid tight channel between said sleeving and said casing, an input conduit connected to said sleeving as to enable a heated fluid to enter said channel whereupon heat energy is transferred to said extended surface and thereupon to said fluid passageway, and an output conduit connected to said sleeving as to enable said heated fluid to depart from said channel.

7. A heat transfering unit for transfering heat vertically downward, said unit comprising:
an outer casing, vertically positioned to intersect a heat source region and a relatively lower heat sink region, said casing defining an internal fluid passageway, an interior fluid transfer conduit vertically positioned within said passageway, condensate pumping means interposed within said casing and connected to said conduit such that a fluid is pumped vertically upward through said conduit to said heat source region, heat absorption means located within said heat source region, said absorption means being in heat transfer relationship with said fluid such that heat absorbed by said absorption means is transmitted to said fluid, whereupon said fluid is caused to vaporize and be propelled by vapor pressurre downward through said internal fluid passageway, heat dissipation means interposed within said heat sink region, said dissipation means being in thermal communication with said internal fluid passageway such that heat energy is transmitted from vapor to said heat dissipation means, and mechanical turbodrive means interposed within said casing and adapted to derive mechanical energy from said vaporized fluid, said mechanical turbodrive means further being mechanically coupled to said pumping means as to enable the operation thereof.

8. A heat transfering unit for transfering heat from a solar collector unit to a relatively lower hot water heater, said unit comprising:
an outer casing connected on its upper end to a solar collector unit with its lower end located within a hot water heater, said casing defining an internal fluid passageway, an interior fluid transfer conduit interposed within said casing extending substantially the length of said casing, fluid pumping means connected to said fluid transfer conduit and being positioned within said hot water heater in the lower portion of said casing, mechanical turbodrive means interposed within said casing and adapted to derive mechanical energy from said vaporized fluid, said mechanical turbodrive means further being mechanically connected to said pumping means as to enable the operation thereof, fluid distribution means located within said solar collector being adapted to distribute a fluid on the surface of said collector to enable the vaporization thereof whereupon said vaporized fluid is propelled by vapor pressure downward from said solar collector through said internal fluid passageway, and heat dissipation means comprising an extended heat transfer surface secured to the exterior surface of said casing within said hot water heater, such that heat energy is transferred to the contents of said hot water heater as said fluid traverses said fluid passageway adjacent to said extended heat transfer surface.

* * * * *

UNITED STATES PATENT AND TRADEMARK OFFICE
CERTIFICATE OF CORRECTION

PATENT NO. : 4,252,185
DATED : Feb. 24, 1981
INVENTOR(S) : Robert Kosson

It is certified that error appears in the above-identified patent and that said Letters Patent are hereby corrected as shown below:

In column 5, line 28, delete "10".

Signed and Sealed this

Nineteenth Day of May 1981

[SEAL]

Attest:

RENE D. TEGTMEYER

Attesting Officer

Acting Commissioner of Patents and Trademarks